United States Patent
Giampaolo et al.

(10) Patent No.: US 8,370,853 B2
(45) Date of Patent: Feb. 5, 2013

(54) EVENT NOTIFICATION MANAGEMENT

(75) Inventors: Dominic Giampaolo, Mountain View, CA (US); Eric Weiss, San Francisco, CA (US); Brent Knight, Austin, TX (US); Pavel Cisler, Los Gatos, CA (US); Peter McInerney, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1035 days.

(21) Appl. No.: 11/499,866

(22) Filed: Aug. 4, 2006

(65) Prior Publication Data

US 2008/0126441 A1    May 29, 2008

(51) Int. Cl.
    *G06F 3/00*    (2006.01)
(52) U.S. Cl. ....................................... 719/318
(58) Field of Classification Search .................. 719/318
    See application file for complete search history.

(56) References Cited

U.S. PATENT DOCUMENTS

| | | |
|---|---|---|
| 5,150,473 A | 9/1992 | Zulch |
| 5,163,148 A | 11/1992 | Walls |
| 5,276,867 A | 1/1994 | Kenley et al. |
| 5,349,658 A | 9/1994 | O'Rourke et al. |
| 5,369,570 A | 11/1994 | Parad |
| 5,664,186 A | 9/1997 | Bennett et al. |
| 5,680,562 A | 10/1997 | Conrad et al. |
| 5,736,974 A | 4/1998 | Selker |
| 5,745,669 A | 4/1998 | Hugard et al. |
| 5,754,178 A | 5/1998 | Johnston et al. |
| 5,758,359 A | 5/1998 | Saxon |
| 5,790,120 A | 8/1998 | Lozares et al. |
| 5,818,936 A | 10/1998 | Mashayekhi |
| 5,819,032 A | 10/1998 | De Vries et al. |
| 5,819,292 A | 10/1998 | Hitz et al. |
| 5,831,617 A | 11/1998 | Bhukhanwala |
| 5,832,526 A | 11/1998 | Schuyler |
| 5,961,605 A * | 10/1999 | Deng et al. ................... 709/234 |
| 5,987,566 A | 11/1999 | Vishlitzky et al. |
| 6,006,227 A | 12/1999 | Freeman et al. |
| 6,023,506 A | 2/2000 | Ote et al. |
| 6,097,313 A | 8/2000 | Takahashi et al. |
| 6,112,318 A | 8/2000 | Jouppi et al. |
| 6,167,532 A | 12/2000 | Wisecup |
| 6,188,405 B1 | 2/2001 | Czerwinski et al. |
| 6,269,381 B1 | 7/2001 | St. Pierre et al. |
| 6,366,988 B1 | 4/2002 | Skiba et al. |

(Continued)

FOREIGN PATENT DOCUMENTS

| | | |
|---|---|---|
| EP | 0629950 | 12/1994 |
| EP | 1152352 | 11/2001 |

(Continued)

OTHER PUBLICATIONS

Michael W. Godfrey, Using Origin Analysis to Detect Merging and splitting of source code entities, Feb. 2005.*

(Continued)

*Primary Examiner* — Lechi Truong
(74) *Attorney, Agent, or Firm* — Fish & Richardson P.C.

(57) ABSTRACT

Systems and methods are provided for event notification. In one implementation, a method is provided. A determination is made as to whether a threshold associated with pending event notifications has been exceeded by an incoming event notification. A plurality of pending event notifications that can be combined are identified. Two or more event notifications are combined.

17 Claims, 6 Drawing Sheets

U.S. PATENT DOCUMENTS

| | | |
|---|---|---|
| 6,396,500 B1 | 5/2002 | Qureshi et al. |
| 6,397,308 B1 | 5/2002 | Ofek et al. |
| 6,424,626 B1 * | 7/2002 | Kidambi et al. ............. 370/236 |
| 6,460,055 B1 | 10/2002 | Midgley et al. |
| 6,604,118 B2 | 8/2003 | Kleiman et al. |
| 6,625,704 B2 | 9/2003 | Winokur |
| 6,629,129 B1 | 9/2003 | Bookspan et al. |
| 6,636,937 B2 | 10/2003 | Peter |
| 6,638,313 B1 | 10/2003 | Freeman et al. |
| 6,711,572 B2 * | 3/2004 | Zakharov et al. ............. 707/10 |
| 6,714,201 B1 | 3/2004 | Grinstein et al. |
| 6,714,952 B2 | 3/2004 | Dunham et al. |
| 6,725,427 B2 | 4/2004 | Freeman et al. |
| 6,728,735 B1 | 4/2004 | Fong |
| 6,768,999 B2 | 7/2004 | Prager et al. |
| 6,785,751 B1 * | 8/2004 | Connor ......................... 710/52 |
| 6,785,786 B1 | 8/2004 | Gold et al. |
| 6,801,229 B1 | 10/2004 | Tinkler |
| 6,857,001 B2 | 2/2005 | Hitz et al. |
| 6,892,211 B2 | 5/2005 | Hitz et al. |
| 6,901,493 B1 | 5/2005 | Maffezzoni |
| 6,918,124 B1 * | 7/2005 | Novik et al. .................. 719/318 |
| 6,948,039 B2 | 9/2005 | Biessener et al. |
| 6,959,368 B1 | 10/2005 | St. Pierre et al. |
| 6,993,710 B1 | 1/2006 | Coad et al. |
| 7,072,916 B1 | 7/2006 | Lewis et al. |
| 7,099,900 B1 | 8/2006 | Bromley et al. |
| 7,103,740 B1 | 9/2006 | Colgrove et al. |
| 7,107,527 B2 | 9/2006 | Takahashi et al. |
| 7,111,136 B2 | 9/2006 | Yamagami |
| 7,133,902 B2 * | 11/2006 | Saha et al. .................... 709/212 |
| 7,155,486 B2 | 12/2006 | Aoshima et al. |
| 7,174,352 B2 | 2/2007 | Kleiman et al. |
| 7,185,028 B2 | 2/2007 | Lechner |
| 7,200,617 B2 | 4/2007 | Kibuse |
| 7,222,194 B2 | 5/2007 | Kano et al. |
| 7,284,190 B2 | 10/2007 | Chellis et al. |
| 7,318,134 B1 | 1/2008 | Oliveira et al. |
| 7,386,801 B1 | 6/2008 | Horvitz et al. |
| 7,418,619 B1 | 8/2008 | Uhlmann et al. |
| 7,434,177 B1 | 10/2008 | Ording et al. |
| 7,440,125 B2 * | 10/2008 | Maekawa et al. ............. 358/1.15 |
| 7,483,693 B2 * | 1/2009 | Lueng et al. ................ 455/414.1 |
| 7,505,762 B2 | 3/2009 | Onyon et al. |
| 7,518,611 B2 | 4/2009 | Boyd et al. |
| 7,558,930 B2 | 7/2009 | Kitamura et al. |
| 7,559,016 B1 | 7/2009 | Rakowski et al. |
| 7,590,668 B2 | 9/2009 | Kathuria et al. |
| 7,624,133 B1 | 11/2009 | Ojalvo |
| 7,630,021 B2 | 12/2009 | Matsuzaka et al. |
| 7,660,817 B2 | 2/2010 | Smith et al. |
| 7,669,141 B1 | 2/2010 | Pegg |
| 7,676,689 B1 | 3/2010 | Shioyama et al. |
| 7,711,771 B2 | 5/2010 | Kirnos |
| 7,734,594 B2 | 6/2010 | Wang |
| 7,809,687 B2 | 10/2010 | Cisler et al. |
| 7,809,688 B2 | 10/2010 | Cisler et al. |
| 7,853,566 B2 | 12/2010 | Cisler et al. |
| 7,853,567 B2 | 12/2010 | Cisler et al. |
| 7,856,424 B2 | 12/2010 | Cisler et al. |
| 7,860,839 B2 | 12/2010 | Cisler et al. |
| 7,934,064 B1 | 4/2011 | Per et al. |
| 8,010,900 B2 | 8/2011 | Hart |
| 8,099,392 B2 | 1/2012 | Paterson et al. |
| 8,166,415 B2 | 4/2012 | Cisler et al. |
| 8,229,897 B2 | 7/2012 | Cannon et al. |
| 2001/0047368 A1 | 11/2001 | Oshinsky et al. |
| 2002/0023198 A1 | 2/2002 | Kokubun et al. |
| 2002/0046220 A1 | 4/2002 | Freeman et al. |
| 2002/0054158 A1 | 5/2002 | Asami |
| 2002/0063737 A1 | 5/2002 | Feig et al. |
| 2002/0080180 A1 | 6/2002 | Mander et al. |
| 2002/0112237 A1 | 8/2002 | Kelts |
| 2002/0156921 A1 | 10/2002 | Dutta et al. |
| 2002/0160760 A1 | 10/2002 | Aoyama |
| 2002/0174283 A1 | 11/2002 | Lin |
| 2003/0016248 A1 | 1/2003 | Hayes Ubillos |
| 2003/0018878 A1 | 1/2003 | Dorward et al. |
| 2003/0050940 A1 | 3/2003 | Robinson |
| 2003/0063128 A1 | 4/2003 | Salmimaa et al. |
| 2003/0065687 A1 | 4/2003 | Momiji et al. |
| 2003/0097640 A1 | 5/2003 | Abrams et al. |
| 2003/0122874 A1 | 7/2003 | Dieberger et al. |
| 2003/0126247 A1 | 7/2003 | Strasser et al. |
| 2003/0131007 A1 | 7/2003 | Schirmer et al. |
| 2003/0135650 A1 | 7/2003 | Kano et al. |
| 2003/0137540 A1 | 7/2003 | Klevenz et al. |
| 2003/0167380 A1 | 9/2003 | Green |
| 2003/0172937 A1 | 9/2003 | Faries et al. |
| 2003/0195903 A1 | 10/2003 | Manley et al. |
| 2003/0220949 A1 | 11/2003 | Witt et al. |
| 2004/0066414 A1 | 4/2004 | Czerwinski et al. |
| 2004/0073560 A1 | 4/2004 | Edwards |
| 2004/0078641 A1 | 4/2004 | Fleischmann |
| 2004/0088331 A1 | 5/2004 | Therrien et al. |
| 2004/0117459 A1 | 6/2004 | Fry |
| 2004/0125137 A1 | 7/2004 | Stata et al. |
| 2004/0133575 A1 | 7/2004 | Farmer et al. |
| 2004/0139396 A1 | 7/2004 | Gelernter et al. |
| 2004/0143652 A1 | 7/2004 | Grannan et al. |
| 2004/0163009 A1 | 8/2004 | Goldstein et al. |
| 2004/0167942 A1 | 8/2004 | Oshinsky et al. |
| 2004/0175000 A1 | 9/2004 | Caronni |
| 2004/0193953 A1 | 9/2004 | Callahan et al. |
| 2004/0199826 A1 | 10/2004 | Bertram et al. |
| 2004/0210608 A1 | 10/2004 | Lee et al. |
| 2004/0220980 A1 | 11/2004 | Forster |
| 2004/0228493 A1 | 11/2004 | Ma |
| 2004/0235523 A1 | 11/2004 | Schrire et al. |
| 2004/0236769 A1 | 11/2004 | Smith et al. |
| 2004/0236916 A1 | 11/2004 | Berkowitz et al. |
| 2004/0267700 A1 | 12/2004 | Dumais et al. |
| 2005/0010955 A1 | 1/2005 | Elia et al. |
| 2005/0071390 A1 | 3/2005 | Midgley et al. |
| 2005/0091596 A1 | 4/2005 | Anthony et al. |
| 2005/0102695 A1 | 5/2005 | Musser |
| 2005/0108253 A1 | 5/2005 | Metsatahti et al. |
| 2005/0138081 A1 | 6/2005 | Alshab et al. |
| 2005/0144135 A1 | 6/2005 | Juarez et al. |
| 2005/0149577 A1 | 7/2005 | Okada et al. |
| 2005/0165867 A1 | 7/2005 | Barton et al. |
| 2005/0187992 A1 | 8/2005 | Prahlad et al. |
| 2005/0204186 A1 | 9/2005 | Rothman et al. |
| 2005/0216527 A1 | 9/2005 | Erlingsson |
| 2005/0246398 A1 | 11/2005 | Barzilai et al. |
| 2005/0262168 A1 | 11/2005 | Helliker et al. |
| 2005/0262377 A1 | 11/2005 | Sim-Tang |
| 2006/0026218 A1 * | 2/2006 | Urmston ....................... 707/204 |
| 2006/0041603 A1 | 2/2006 | Paterson et al. |
| 2006/0041823 A1 | 2/2006 | Wolfgang et al. |
| 2006/0053332 A1 | 3/2006 | Uhlmann |
| 2006/0064444 A1 | 3/2006 | Van Ingen et al. |
| 2006/0064634 A1 | 3/2006 | Dettinger et al. |
| 2006/0080521 A1 | 4/2006 | Barr et al. |
| 2006/0085792 A1 | 4/2006 | Traut |
| 2006/0085817 A1 | 4/2006 | Kim et al. |
| 2006/0101384 A1 | 5/2006 | Sim-Tang et al. |
| 2006/0106893 A1 | 5/2006 | Daniels et al. |
| 2006/0117309 A1 | 6/2006 | Singhal et al. |
| 2006/0137010 A1 | 6/2006 | Kramer et al. |
| 2006/0143250 A1 | 6/2006 | Peterson et al. |
| 2006/0150107 A1 | 7/2006 | Leung et al. |
| 2006/0156246 A1 | 7/2006 | Williams et al. |
| 2006/0161861 A1 | 7/2006 | Holecek et al. |
| 2006/0218363 A1 | 9/2006 | Palapudi |
| 2006/0248294 A1 | 11/2006 | Nedved et al. |
| 2006/0253470 A1 | 11/2006 | Friedman et al. |
| 2007/0027935 A1 | 2/2007 | Haselton et al. |
| 2007/0030528 A1 | 2/2007 | Quaeler et al. |
| 2007/0038884 A1 | 2/2007 | Campbell et al. |
| 2007/0043790 A1 | 2/2007 | Kryger |
| 2007/0070066 A1 | 3/2007 | Bakhash |
| 2007/0078910 A1 | 4/2007 | Bopardikar |
| 2007/0088702 A1 | 4/2007 | Fridella et al. |
| 2007/0094312 A1 | 4/2007 | Sim-Tang |
| 2007/0106978 A1 | 5/2007 | Felts |
| 2007/0136381 A1 | 6/2007 | Cannon et al. |

| | | | |
|---|---|---|---|
| 2007/0136389 A1 | 6/2007 | Bergant et al. |
| 2007/0156772 A1 | 7/2007 | Lechner |
| 2007/0168497 A1 | 7/2007 | Locker et al. |
| 2007/0185879 A1 | 8/2007 | Roublev et al. |
| 2007/0185922 A1 | 8/2007 | Kapoor et al. |
| 2007/0192386 A1 | 8/2007 | Fries et al. |
| 2007/0266007 A1 | 11/2007 | Arrouye et al. |
| 2007/0271263 A1 | 11/2007 | Merrild |
| 2007/0271303 A1 | 11/2007 | Menendez et al. |
| 2007/0288536 A1 | 12/2007 | Sen et al. |
| 2008/0016576 A1 | 1/2008 | Ueda et al. |
| 2008/0022393 A1 | 1/2008 | Waltermann et al. |
| 2008/0028007 A1 | 1/2008 | Ishii et al. |
| 2008/0033922 A1 | 2/2008 | Cisler et al. |
| 2008/0033969 A1 | 2/2008 | Koo et al. |
| 2008/0034004 A1 | 2/2008 | Cisler et al. |
| 2008/0034011 A1 | 2/2008 | Cisler et al. |
| 2008/0034013 A1 | 2/2008 | Cisler et al. |
| 2008/0034016 A1 | 2/2008 | Cisler et al. |
| 2008/0034017 A1 | 2/2008 | Giampaolo et al. |
| 2008/0034018 A1 | 2/2008 | Cisler et al. |
| 2008/0034019 A1 | 2/2008 | Cisler et al. |
| 2008/0034039 A1 | 2/2008 | Cisler et al. |
| 2008/0046557 A1 | 2/2008 | Cheng |
| 2008/0059894 A1 | 3/2008 | Cisler et al. |
| 2008/0065663 A1 | 3/2008 | Farlee et al. |
| 2008/0070496 A1 | 3/2008 | Jackson |
| 2008/0077808 A1 | 3/2008 | Teicher et al. |
| 2008/0082578 A1 | 4/2008 | Hogue et al. |
| 2008/0091655 A1 | 4/2008 | Gokhale et al. |
| 2008/0126441 A1 | 5/2008 | Cisler et al. |
| 2008/0126442 A1 | 5/2008 | Cisler et al. |
| 2008/0141029 A1 | 6/2008 | Culver |
| 2008/0168184 A1 | 7/2008 | Freedman et al. |
| 2008/0168245 A1 | 7/2008 | De Atley et al. |
| 2008/0168391 A1 | 7/2008 | Robbin et al. |
| 2008/0172607 A1 | 7/2008 | Baer |
| 2008/0177961 A1 | 7/2008 | McSharry et al. |
| 2008/0208630 A1 | 8/2008 | Fors et al. |
| 2008/0214163 A1 | 9/2008 | Onyon et al. |
| 2008/0216011 A1 | 9/2008 | Gould |
| 2008/0229037 A1 | 9/2008 | Bunte et al. |
| 2008/0250342 A1 | 10/2008 | Clark et al. |
| 2008/0285754 A1 | 11/2008 | Kezmann |
| 2008/0307000 A1 | 12/2008 | Paterson et al. |
| 2008/0307017 A1 | 12/2008 | Lyons et al. |
| 2008/0307018 A1 | 12/2008 | Ulrich et al. |
| 2008/0307019 A1 | 12/2008 | Weiss et al. |
| 2008/0307020 A1 | 12/2008 | Ko et al. |
| 2008/0307175 A1 | 12/2008 | Hart et al. |
| 2008/0307333 A1 | 12/2008 | McInerney et al. |
| 2008/0307347 A1 | 12/2008 | Cisler et al. |
| 2008/0310633 A1 | 12/2008 | Brown et al. |
| 2009/0031401 A1 | 1/2009 | Cudich et al. |
| 2009/0254591 A1 | 10/2009 | Weiss et al. |
| 2009/0307333 A1 | 12/2009 | Welingkar et al. |
| 2010/0017855 A1 | 1/2010 | Johnson et al. |
| 2010/0217929 A1 | 8/2010 | Kirshenbaum et al. |
| 2011/0016089 A1 | 1/2011 | Freedman et al. |
| 2011/0083088 A1 | 4/2011 | Cisler et al. |
| 2011/0083098 A1 | 4/2011 | Cisler et al. |
| 2011/0087976 A1 | 4/2011 | Cisler et al. |
| 2011/0302502 A1 | 12/2011 | Hart et al. |
| 2012/0124507 A1 | 5/2012 | Paterson et al. |
| 2012/0198383 A1 | 8/2012 | Cisler et al. |

FOREIGN PATENT DOCUMENTS

| | | |
|---|---|---|
| EP | 1582982 | 10/2005 |
| WO | 01/06356 | 1/2001 |
| WO | 02/101540 | 12/2002 |
| WO | 05/045756 | 5/2005 |
| WO | 2008/019237 | 2/2008 |

OTHER PUBLICATIONS

"Apple Previews Mac OS X Leopard," Aug. 7, 2006 [online] [retrieved on Nov. 26, 2007] Retrieved from the Internet:<URL:apple.com/pr/library/2006/aug/07leopard.html>, pp. 1-2.

"Aulaclic: Unit 6. The Recycle Bin," Nov. 2005 [online] [retrieved on Nov. 26, 2007] Retrieved from the Internet:<URL:teacherclick.com/winxp/t_6_1.htm>, pp. 1-2.

Bonwick, Jeff, "ZFS the Last Word in File Systems," [online] [retrieved on Jan. 22, 2008] Retrieved from the Internet:<URL:opensolaris.org/os/community/zfs/docs/zfs.pdf>, 34 pages.

Bonwick et al., "The Zettabyte File System," [online] [retrieved on Jan. 22, 2008] Retrieved from the Internet:<URL:partneradvantage.sun.com/protected/solaris10/adoptionkit/tech/zfs/zfs_overview.pdf>, 13 pages.

Griffiths, R., "Leopard first looks: Time Machine," Aug. 8, 2006 [online] [retrieved on Nov. 23, 2007] Retrieved from the Internet:<URL:www.macworld.com/2006/08/firstlooks/leotimemac/index.php?pf=1> pp. 1-2.

International Search Report and Written Opinion, PCT/US2007/074729, Jul. 12, 2007, 11 pages.

International Search Report and Written Opinion, PCT/US2007/074881, Jul. 12, 2007, 11 pages.

Sun Microsystems, Inc., "ZFS On-Disk Specification," Draft: Dec, 9, 2005, [online] [retrieved on Jan. 22, 2008] Retrieved from the Internet:<URL:opensolaris.org/os/community/zfs/docs/ondiskformat0822.pdf,>, 55 pages.

Bott, "Windows XP Backup Made Easy," [online] [Retrieved on Jul. 7, 2009]; Retrieved from the Internet URL:microsoft.com/windowsxp/using/setup/learnmore/bott_03july14.mspx, 4 pages.

Engst, "Retrospect 6.0: Powerful Backup Program Adds Panther Compatibility and Enterprise Features", [online] [Retrieved on Jul. 8, 2009]; Retrieved from the Internet URL:macworld.com/article/31038/2004/06/retrospect6x0.html, 8 pages.

Harder, "Microsoft Windows XP System Restore," [online] [Retrieved on Jul. 7, 2009] Retrieved from the Internet URL:msdn.microsoft.com/en-us/library/ms997627,aspx, 8 pages.

"MSDN Academic Alliance Developer Center, Curriculum Repository Glossary," [online]. Retrieved from the Internet <URL:academicresourcecenter.net/curriculum/glossary.aspx>, retrieved on Apr. 22, 2009, 4 pages.

"StorageSync: Backup, Restore, & Synchronization Software User's Guide", SimpleTech, 2003, 100 pages.

International Search Report and Written Opinion, PCT/US2008/066212, Mar. 9, 2009, 26 pages.

International Search Report and Written Opinion, PCT/US2007/074863 Apr. 21, 2009, 20 pages.

Communication pursuant to Article 94(3) EPC for Application No. EP 07 799 899.5, dated May 14, 2009, 2 pages.

Tittel, Ed. "An EAZ Way to Restore Crippled and Inoperable Systems." ChannelWeb. Apr. 25, 2005. crn.com/white-box/161502165.

"What's New in Word 2002." Wellesly College Information Services Computing Documentation, Jan. 2002, wellesley.edu/Computing/Office02/Word02/word02.html. Accessed Aug. 12, 2008.

International Search Report and Written Opinion, PCT/US2007/074653, Aug. 14, 2008, 14 pages.

International Search Report and Written Opinion, PCT/US2008/065146, Oct. 31, 2008, 21 pages.

"How to Interpret Windows Installer Logs," [Online] [Retrieved on Dec. 12, 2009] Retrieved from the Internet URL: http://blogs.technet.com/richard_macdonald/archive/2007/04/02/How-to-Interpret-Windows-Installer-Logs.aspx; published Apr. 4, 2007; 6 pages.

"How to Interpret Windows Installer Logs," [Online] [Retrieved on Dec. 12, 2009] Retrieved from the Internet URL:blogs.technet.com/richard_macdonald/archive/2007/04/02/How-to-Interpret-Windows-Installer-Logs.aspx; published Apr. 4, 2007; 6 pages.

Posey, Brien M., "Working with the Windows Server 2003 Volume Shadow Copy Service". Published Jun. 24, 2004. windowsnetworking.com/articles_tutorials/Windows-Server-2003-Volume-Shadow-Copy-Service.html.; 11 pages.

Extended International Search Report and Written Opinion, EP 11171738.5, Aug. 29, 2011, 5 pages.

Microsoft-TechNet, "Using Encrypting File System," Nov. 3, 2005, Microsoft, 40 pages.

In-link files, The Open Group Base, Specifications Issue 6 [online] IEEE Std 1003.1, 2004 Edition. [retrieved on Apr. 6, 2011]. Retrieved from the Internet:URL:http://pubs.opengroup.org/onlinepubs/009695399/utilities/In.html, 5 pages.

Microsoft Technet: "Restore a previous version of a file," Jan. 21, 2005, [Online] [Retrieved on Oct. 20, 2011] Retrieved from the Internet URL: http://technet.microsoft.com/en-us/library/cc778220(d=printer,v=WS.10).aspx, pp. 1-2.

Examination Report from European Application No. 07 813 605.8 dated Oct. 27, 2011, 5 pages.

Examination Report from European Application No. 07 813 540.7 dated Oct. 27, 2011, 5 pages.

Extended European Search Report, European Application No. 11184579.8, Nov. 17, 2011, 6 pages.

Office Action dated Feb. 29, 2012 from related Chinese Application No. 200880024710.0, 11 pages.

Communication pursuant to Article 94(3) EPC for Application No. EP 07 799 899.5, dated Oct. 7, 2009, 4 pages.

* cited by examiner

EVENT NOTIFICATION MANAGEMENT

RELATED APPLICATIONS

U.S. patent application Ser. No. 11/499,839, for "Managing Backup of Content," filed Aug. 4, 2006 now, U.S. Pat. No. 7,809,688;

U.S. patent application Ser. No. 11/499,881, for "User Interface for Backup Management," filed Aug. 4, 2006, now U.S. Pat. No. 7,856,424;

U.S. patent application Ser. No. 11/499,385, for "Searching a Backup Archive," filed Aug. 4, 2006 now, U.S. Pat. No. 7,809,687;

U.S. patent application Ser. No. 11/499,885, for "Conflict Resolution in Recovery of Electronic Data," filed Aug. 4, 2006 now, U.S. Pat. No. 7,853,567;

U.S. patent application Ser. No. 11/499,250, for "Application-Based Backup-Restore of Electronic Information," filed Aug. 4, 2006, now U.S. Pat. No. 7,860,839.

TECHNICAL FIELD

The disclosed implementations relate generally to storing and restoring data.

BACKGROUND

A hallmark of modern graphical user interfaces is that they allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

With the sophisticated tools available, users are encouraged not only to create and save a multitude of items in their computers, but to revise or otherwise improve on them over time. For example, a user can work with a certain file and thereafter save its current version on a storage device. The next day, however, the user could have had second thoughts about the revisions, or could have come up with new ideas, and therefore opens the file again.

The revision process is usually straightforward if the user wants to add more material to the file or make changes to what is there. But it is typically more difficult for a user who has changed his/her mind about changes that were previously made and wants the file back as it was once before. Application programs for word processing typically let the user "undo" previous edits of a text, at least up to a predefined number of past revisions. The undo feature also usually is configured so that the previously made revisions must be undone in reverse chronological order; that is, the user must first undo the most recently made edit, then the second-most recent one, and so on. If the user saves and closes the document and thereafter opens it again, it may not be possible to automatically undo any previous edits.

Virtually all computer systems generate event information of some form during operation. For example, "file system events" are used in the Apple Mac OS® X (a corresponding PC version is NT ChangeLog) to provide event notifications for all file system activity (e.g., add file, change file, delete file, etc). Some event information can generate a large data stream, and the capacity to store event notifications can be limited. Additionally, a particular event can require some action by the system and can therefore block the flow of events. To address this situation, event notifications are sometimes dropped to make room for incoming events.

SUMMARY

Systems and methods are provided for event notification. Events, such as file changes, can be monitored. The event notifications from these events can be used, for example, by a backup system to identify changed data for the next incremental backup operation. The number of event notifications can be limited, leading to dropped events. Dropped events prevent the system from knowing what was changed without searching everything (e.g., searching an entire file system). The loss can be limited by managing the event notifications to combine the event notifications as necessary to maintain space for new incoming events. For example, event notifications for changes to files in a same folder can be combined to a single event notification at a parent level (e.g., a folder that contains the files) to reduce space. Only that parent will need scanned or otherwise examined to determine the changed files instead of the entire file system.

In general, in one aspect, a method is provided. A determination is made as to whether a threshold associated with pending event notifications has been exceeded by an incoming event notification. A plurality of pending event notifications that can be combined are identified. Two or more event notifications are combined.

Implementations of the method can include one or more of the following features. Each event notification can identify a change to an entry in a data system. Each event notification can be associated with one or more parent levels of a hierarchical file system and identifying event notifications that can be combined comprises determining two or more event notifications having a common parent level. Combining two or more event notification can include replacing two or more event notifications with a single event notification identifying a change to the common parent level.

The method can further include scanning the common parent level to identify the combined event notifications and performing a backup operation including backup data associated with the combined event notifications. Scanning the common parent level can include comparing the parent data with data from a previous backup to identify changed data. Receiving an incoming event notification can include receiving an event notification identifying a change to a file system at an event notification queue. The method can further include identifying one or more event notifications as protected, where protected event notifications can not be combined. The method can further include determining a number of event notifications to combine according to one or more criteria. The criteria can include minimizing a number of combined event notifications. Minimizing the number of combined event notifications can include combining a minimum number of event notifications such that the incoming event notification does not exceed the threshold.

In general, in one aspect, a system is provided. The system includes a monitoring engine for monitoring incoming event notifications. The system includes an event notification queue and an event combiner for combining event notifications in the event notification queue. The system also includes an event notification manager.

In general, in one aspect, a method is provided. A determination of whether a backup event has occurred is made. Event notifications are evaluated. A backup is generated according to the event notifications. Evaluating event notifications can include identifying an event notification that is a combination of two or more event notifications and scanning data associated with the event notification to identify the combined event notifications.

Particular embodiments of the subject matter described in this specification can be implemented to realize one or more of the following advantages. The system can combine event notifications in order to reduce dropped event notifications. By combining events, the original event notifications can be more easily identified.

The details of the various aspects of the subject matter described in this specification are set forth in the accompanying drawings and the description below. Other features, aspects, and advantages of the invention will become apparent from the description, the drawings, and the claims.

DETAILED DESCRIPTION

Figure 1:
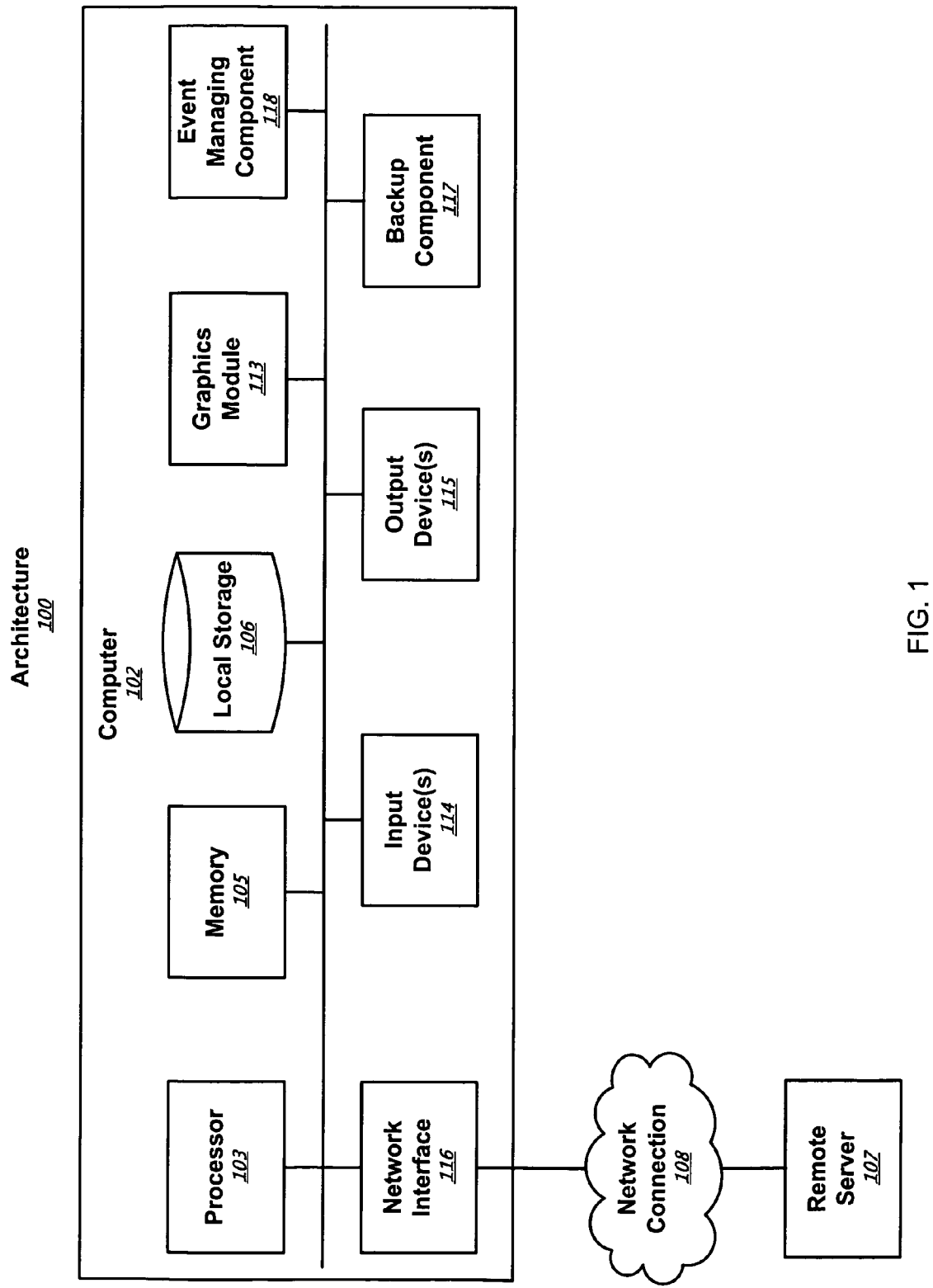
FIG. 1 is a block diagram of an example of an architecture for tracking file system events.

FIG. 1 is a block diagram of an architecture 100 that manages generated event notifications and handles them accordingly. As used herein, an event notification corresponds to activity related to one or more data elements within a computer system. The architecture 100 includes a personal computer 102 communicatively coupled to a remote server 107 via a network interface 116 and a network 108 (e.g., local area network, wireless network, Internet, intranet, etc.). The computer 102 generally includes a processor 103, memory 105, one or more input devices 114 (e.g., keyboard, mouse, etc.) and one or more output devices 115 (e.g., a display device). A user interacts with the architecture 100 via the input and output devices 114, 115. Architecture 100 as disclosed includes various hardware elements. Architecture 100 can include hardware, software, and combinations of the two.

The computer 102 also includes a local storage device 106 and a graphics module 113 (e.g., graphics card) for storing information and generating graphical objects, respectively. The local storage device 106 can be a computer-readable medium. The term "computer-readable medium" refers to any medium that includes data and/or participates in providing instructions to a processor for execution, including without limitation, non-volatile media (e.g., optical or magnetic disks), volatile media (e.g., memory) and transmission media. Transmission media includes, without limitation, coaxial cables, copper wire, fiber optics, and computer buses. Transmission media can also take the form of acoustic, light or radio frequency waves.

While event management is described herein with respect to a personal computer 102, it should be apparent that the disclosed implementations can be incorporated in, or integrated with, any electronic device that has a user interface, including without limitation, portable and desktop computers, servers, electronics, media players, game devices, mobile phones, email devices, personal digital assistants (PDAs), embedded devices, televisions, other consumer electronic devices, etc.

Systems and methods are provided for managing events regarding system information, application information or system, application, or user interface state. The systems and methods can be stand alone, or otherwise integrated into a more comprehensive application. In the materials presented below, an integrated system and method for event management is disclosed.

One of ordinary skill in the art will recognize that the engines, methods, processes and the like that are described can themselves be an individual process or application, part of an operating system, a plug-in, an application, or the like. In one implementation, the system and methods can be implemented as one or more plug-ins that are installed and run on the personal computer 102. The plug-ins are configured to interact with an operating system (e.g., MAC OS® X, WINDOWS XP, LINUX, etc.) and to perform the various functions, as described with respect to the Figures. A system and method for modifying a user interface view can also be implemented as one or more software applications running on the computer 102. As used herein, a view refers to an item, element, or other content, capable of being presented in a user interface, that can be subjected to a backup operation by a backup component 117. For example, a user interface view can contain any number of icons, files, folders, application state information and/or machine state information, etc. Such a system and method can be characterized as a framework or model that can be implemented on various platforms and/or networks (e.g., client/server networks, wireless networks, stand-alone computers, portable electronic devices, mobile phones, etc.), and/or embedded or bundled with one or more software applications (e.g., email, media player, browser, etc.).

The computer 102 includes a backup component 117 that allows for the storage of versions of the computer's files or other items, for example within the local storage 106 or in an external storage repository. The backup component 117 captures versions of one or more interface views and manages an archive of such backups, for example to facilitate user-initiated restoration based on any of them. As used herein, a view refers to an item, element or other content, capable of being presented in a user interface, that can be subjected to a backup operation by the backup component 117. For example, a user interface view can contain any number of icons, files, folders, application state information, and/or machine state information, etc. In one implementation, the backup component 117 also allows a user to select any of the stored versions and use it to initiate a restoration of that version in the computer 102.

Though discussion is made with reference to a particular user interface view, those of ordinary skill will recognize that such a view can be based on various data structures, files, processes, and other aspects of information management. It follows that modification to file structures, data and the like is also contemplated in order to achieve the modification to the user interface view. In other words, while the restoration of the user interface view from one state to another is the most apparent change from the user's perspective, this is accomplished through the corresponding changes in the underlying system content.

An event managing component 118 monitors and manages events within the computer 102. For example, such events can be generated by one or more event logging tools. In one implementation, the event logging tool is a file system event tool such as FS Events (available in products from Apple Computer in Cupertino, Calif.). The event managing component 118 stores and manages the event notifications as will be described below. For example, the backup component 117 can use a compiled list of events to determine which changed elements should be archived.

Figure 2:
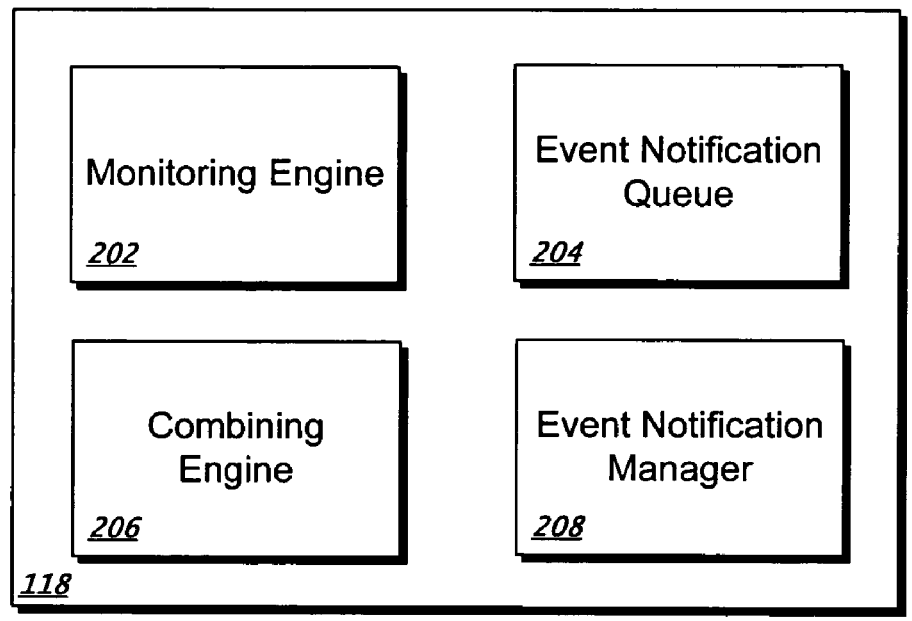
FIG. 2 is a block diagram of an example of an architecture of an event managing component.

FIG. 2 is a block diagram of an architecture 200 with examples of features that can be included in the event managing component 118. The event managing component 118 here contains a monitoring engine 202, an event notification queue 204, a combining engine 206, and an event notification manager 208. An exemplary operation of the event managing component 118 is as follows. The monitoring engine 202 captures a new event that is to be forwarded for storage in the event notification queue 204 until it can be processed. If the event notification manager 208 recognizes that the event notification queue 204 is reaching capacity, the event notification manager 208 can instruct the combining engine 206 to combine two or more of the events into a combined event to save capacity in the event notification queue 204. For example, if the newly received event relates to a change in a particular directory or folder, that event can be combined with one or more other events relating to the same directory or folder. In some implementations, this causes the information about the specific changes to be lost, but the combined event identifies the localized area (e.g., the directory or folder) that was changed. When the combined event is to be processed, the system can scan the identified directory or folder to identify the changes that were made.

The monitoring engine 202 detects incoming event notifications. In one implementation, the event notifications originate from a file system activity monitor. An event can occur to a file, folder, data set, system setting, state information, or other individual data element within a computer system. Events include, but are not limited to, element addition, element modification, element deletion, etc. The monitoring engine 202 sends the incoming events for storage processing. If there is currently sufficient capacity in the event notification queue 204, the detected events remain stored there. In contrast, if the event notification queue 204 currently has insufficient capacity, a check is made to determine whether two or more events can be combined. For example, if the event notification queue 204 is above a set threshold capacity, automatic combining of events can help clear space within the queue.

When the event notification queue 204 receives an incoming event, it is first determined whether the event notification queue has the capacity to add the new notification. In one implementation, the capacity determination is made by the event notification queue 204 and the results forwarded to the event notification manager 208. In another implementation, the capacity determination is made by the event notification manager 208 acting on event volume information received from the event notification queue 204.

Events can be removed from the event notification queue 204 by processing the events stored within the queue. For example, after the backup component 117 uses the events stored within the event notification queue 204 to create a new archive view, the information within the event notification queue is no longer needed. Events can also be removed from the event notification queue by creating a combined event. In one implementation, all events covered by the scope of the combined event are deleted from the queue upon the addition of the combined event. Thereafter, individual events can be rediscovered by scanning the structure shared by the combined events, such as a parent folder.

When the event notification queue 204 is at or above capacity or threshold, the combining engine 206 can first attempt to find one or more events within the event notification queue 204 that can be combined with a newly received event. As another example, the combining engine 206 can attempt to find two or more events within the event notification queue 204 that can be combined with each other, to free up resources for handling the newly received event. Thus, in the latter situation, the newly received event is not included in the event combination.

The combining engine 206 can take into account one or more protection levels in attempting to combine event notifications. That is, one or more event notifications can be identified as protected, meaning that the event notification(s) can not be combined with other event notifications. For example, the protection can be set for those event notifications that can be expected to create worse problems than other event notifications if they are lost before they can be processed.

If the event notification queue 204 is at or above capacity and there are no combinable events, one or more events can be dropped based on a prioritization scheme. For example, it can be considered critical not to lose a file renaming event, because it can later lead to anomalies and be very difficult to detect. Such critical events can be identified as protected event notifications, which are not combinable. In contrast, a regularly scheduled status update can sometimes be lost without causing significant problems. In one implementation, non-critical events can be dropped in these or other situations. In the later event of queue processing, the backup component 117 will need to scan globally for all element changes in addition to using the critical events contained within the event notification queue 204.

The combining engine 206 can be triggered by the event notification manager 208 to combine individual events within the event notification queue 204. In one implementation, the combining engine is activated when the event notification queue 204 is at maximum capacity. In another implementation, the event notification queue 204 has a threshold level determining when to engage the combining engine 206.

In some implementations, the scope of combining activity is based upon system or user settings. For example, the combining engine 206 can begin combining events in no particular order until a queue threshold level has been met. In another implementation, the combining engine 206 can seek out the combinations that are more preferable to make. For example, it could be preferable to combine events that have a high degree of common hierarchical parentage, such as by being related to the same structure in the hierarchy. In contrast, it could be less preferable to combine events that are more unrelated to each other in the hierarchy. This is because the scope and amount of scanning needed in the former case can be less than that necessary in the latter case.

To create a combination event, the combining engine 206 scans the event notification queue 204 and analyzes the events to determine whether two or more events are combinable. For example, the combining engine 206 can look for elements that share a common feature, such as a parent directory. The combining engine 206 then creates a new combination event regarding the common feature. The combining engine 206 drops the individual events comprising the new combination event from the event notification queue 204 and replaces them with the combination event. In some implementations, the combining engine 206 merges the involved events to form the combined event.

The event notification manager 208 manages the operation of the monitoring engine 202 and the combining engine 206. In addition, the event notification manager 208 can monitor the status of the event notification queue 204. In one implementation, the event notification manager 208 instructs the combining engine 206 to combine events. In one implementation, the event notification manager 208 contains a set of values relating to the trigger events for the combining engine 206. For example, the set of values can contain a queue threshold value at which combination of events should occur. The set of values can also include a lower threshold value at which the combining engine 206 should cease the combining operation. The event notification manager 208, in one implementation, triggers the removal of unnecessary event notifications, for example, after the contents of the event notification queue 204 have been processed by the backup component 117.

During the processing of events within the event notification queue 204, the shared feature listed within each combination event can be perused to determine which elements within that shared feature have undergone changes. For example, if the event combination involved two events relating to changes in two images located in the same photo album, the combined event can identify the photo album as a general indication that two or more system events relating to that album have been dropped. In the event processing, then, the album contents can be scanned (or otherwise analyzed) to determine what events relating to the album need to be rediscovered. Upon determining, in this example, that the dropped events related to changes in two of the images, the event managing component 118 can process these rediscovered events similarly to a scenario where they had not been dropped.

The processing of events can include interaction with the backup component 117. In the above example, where there had been changes in two images, the event managing component 118 can trigger the backup component 117 to create new backup versions of the altered images.

In one implementation, the combining engine 206 can also prune events from the event notification queue 204. For example, the combining engine 206 can scan the event notification queue 204 for multiple events that occurred to the same element, because such events can render each other superfluous or moot, at least in part. For example, adding a new element and then deleting the same element is an example of two events that effectively cancel each other out. In another example, successive additions to a text file can be pruned to a single modification event. Thus, the combining engine 206 can drop one or more events as redundant.

Figure 3:
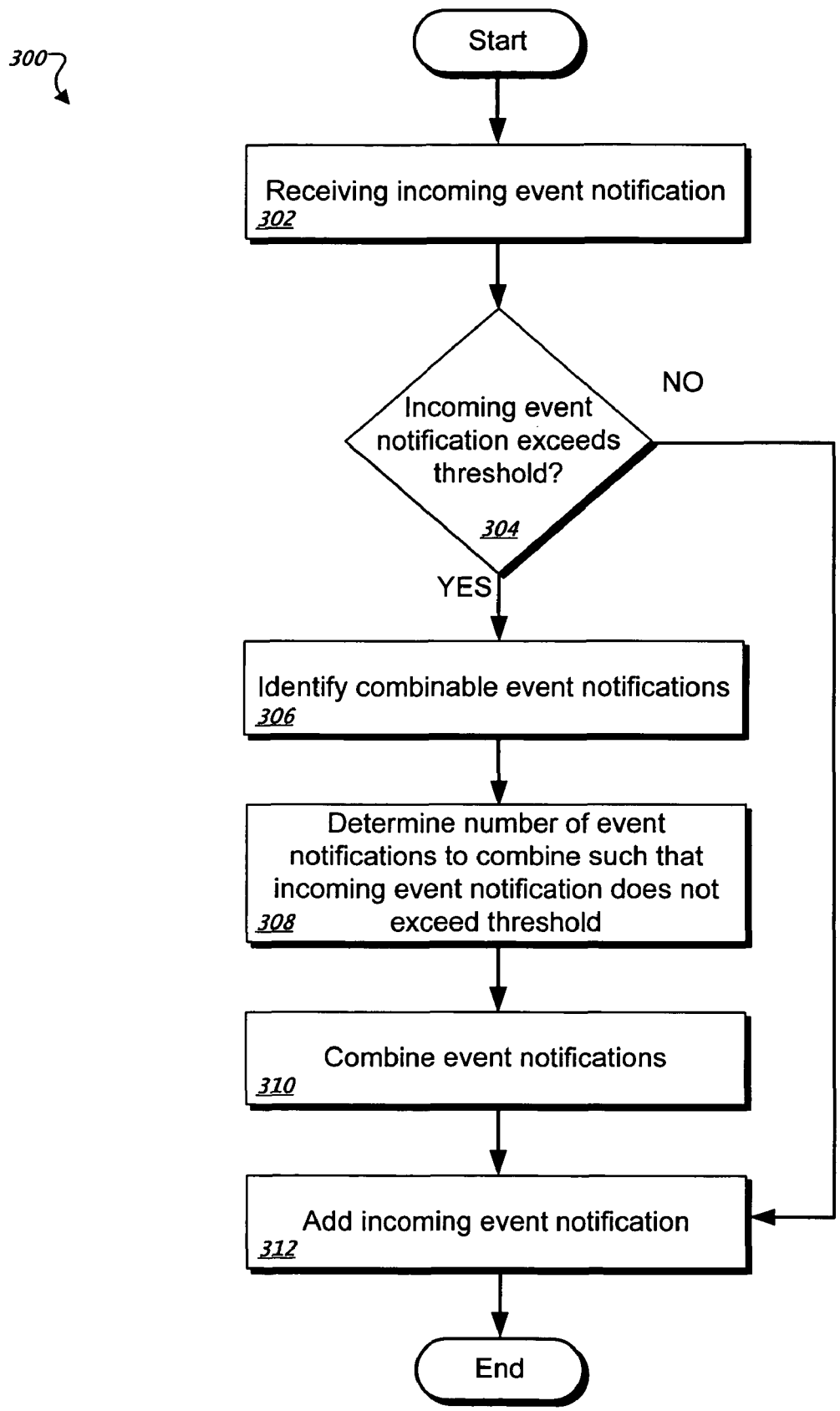
FIG. 3 is a flow chart of exemplary operations that can be performed to store an event notification.

FIG. 3 is a flow chart of exemplary operations 300 that can be performed in relation to event generation and management. The operations begin in step 302 with receiving an incoming event notification. In one implementation, the event notification can be detected by the monitoring engine 202 (FIG. 2). The incoming event, in one example, originates from a file system event logging tool.

In step 304, the operation determines whether the addition of the incoming event notification exceeds a threshold value associated with the event queue. For example, this determination can be made by the event notification queue 204 (FIG. 2). In another implementation, the threshold capacity can be detected by the event notification manager 208 (FIG. 2). If the answer in step 304 is yes, then combinable event notifications are identified in step 306. For example, event notifications are combinable if they have a shared feature, e.g., a shared parent directory or other hierarchical structure, such that by scanning the shared feature, all of the combinable event elements can be located within that feature. In one implementation, the combining engine 206 (FIG. 2) locates combinable events. For example, the operation can first attempt to identify any elements that share the same parent structure. If there are no such events, or if the combination thereof does not free up sufficient space in the notification queue, the operation can then move up a hierarchical tree, determining potential combinations among two or more events that share relatively less commonality that those considered earlier.

Once combinable event notifications have been identified, the number of event notifications to combine can be determined, in step 308. In one implementation, the operation desires to combine a sufficient number of events such that an incoming event notification will not exceed the queue threshold. The number of event notifications to combine can, in one implementation, be based on default or user settings. For example, in addition to a higher threshold setting that triggers event combination, the event notification manager 208 can contain a lower threshold setting that is the goal for the combining engine 206 when combining events. In one implementation, the order of steps 306 and 308 can be reversed.

In step 310, event notifications are combined. For example, the combining engine 206 can combine the most recently received event notification with one or more previously received ones. In one implementation, notification events can be combined with previously combined events, or previously combined events can be combined with each other, to create additional combination events at a higher hierarchical level. In some implementations, a new event notification is generated and used as the combined event, in other implementations one of the events being combined is modified to be the combined event.

In one implementation, the system can scan (e.g., prior to initiating a backup operation) the particular structure (e.g., folder, directory, or other hierarchical level) that includes combined event notifications in order to determine the underlying events. For example, if two file events were combined into a single folder event notification, the folder is examined to identify which files were the source of the file events that have been lost. In one implementation, the system can compare the folder data with an archive version (e.g., from a previous backup operation) in order to determine which files have changed data, indicating they were the source of the combined file event notifications.

In step 312, the incoming event notification is added to the notification queue. When the threshold was not exceeded in step 304, the newly received notification can be added without modification. In contrast, when the threshold was exceeded in step 304, the notification that is added in step 312 can be a combined event resulting from the steps 306-310. In one implementation, the event notification manager 208 adds the incoming event to the event notification queue 204.

Figure 4:
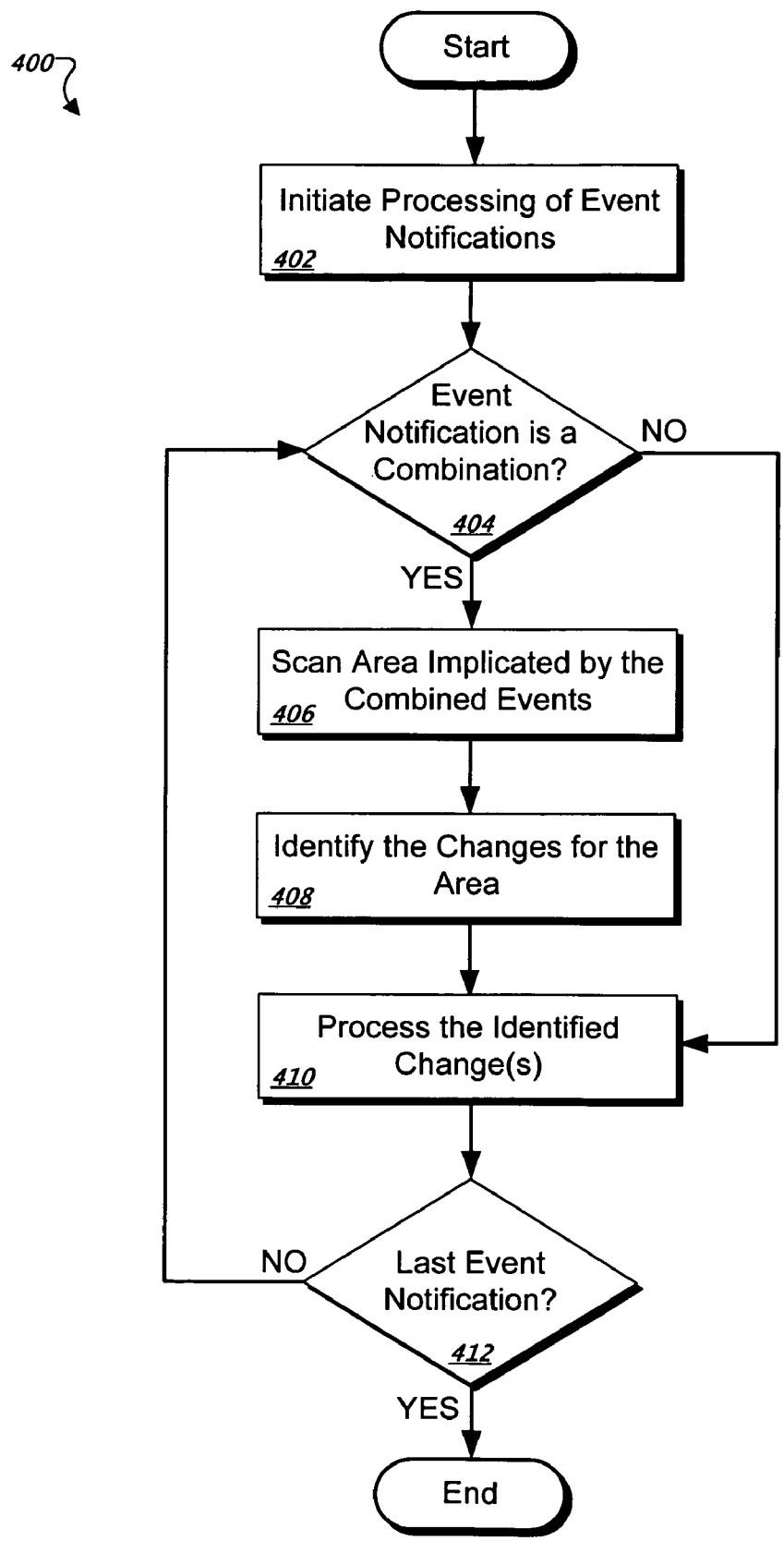
FIG. 4 is a flow chart of exemplary operations that can be performed to process event notifications.

FIG. 4 is a flow chart of exemplary operations 400 that can be performed in relation to event generation and management. For example, the operations 400 can be performed in processing a queue of event notifications that could include one or more combined event notifications. As has been noted above, in some implementations, when two or more event notifications are combined, the information about the events that triggered them is lost, at least in part. In such situations, for example, the operations 400 can be performed in an attempt to rediscover that missing information so that the events can be processed.

The operations begin at step 402 with the initiation of the processing of event notifications. For example, this can involve initiating the event managing component 118 (FIG. 1). As has been mentioned, the event managing component 118 can process event notifications that are stored in a queue.

In step 404, it is determined, for each event notification, whether the notification is a combination of two or more event notifications. If so, the operation scans the area implicated by the combined events, in step 406. For example, when two events relating to the same folder are combined, information about the events can be lost. Although the specifics of the events are no longer known, it is known that they related to a particular folder. The folder can then be considered a hierarchical region that is implicated by these combined events. The system can attempt to rediscover the missing information by scanning the folder. For example, the event managing component 118 can scan each element within the hierarchical region implicated by the combined event, such as by comparing each element's timestamp to the timestamp of the previously generated backup version. In another implementation, the backup component 117 compares the contents of the hierarchical region to the contents of that region within the previously generated backup version to determine the change(s). Other approaches can be used to rediscover the lost event notifications.

In step 408, the operation identifies all changed elements within the implicated area. For example, changes can include added data elements, modified data elements, and deleted data elements, etc. The operation then processes the identified change(s) in step 410. The change(s) processed in step 410 can be from a non-combined event following the determination in step 404, or from two or more previously combined events that were rediscovered in steps 406-408. In processing the changes, in one implementation, the backup component 117 can use the list of changed elements to generate a new backup version of each element.

If, at step 412, it is found that this is not the last event notification in the list, the operation returns to step 404 to process at least one more event notification. If, instead, this is the last notification to be processed, the operation ends. In one implementation, at the termination of the event processing operation, the event notification manager (208) can trigger the cleaning of the event notification queue 204 to clear it of all stored events. The operations 400 can be repeated in part or in whole as required.

Figure 5:
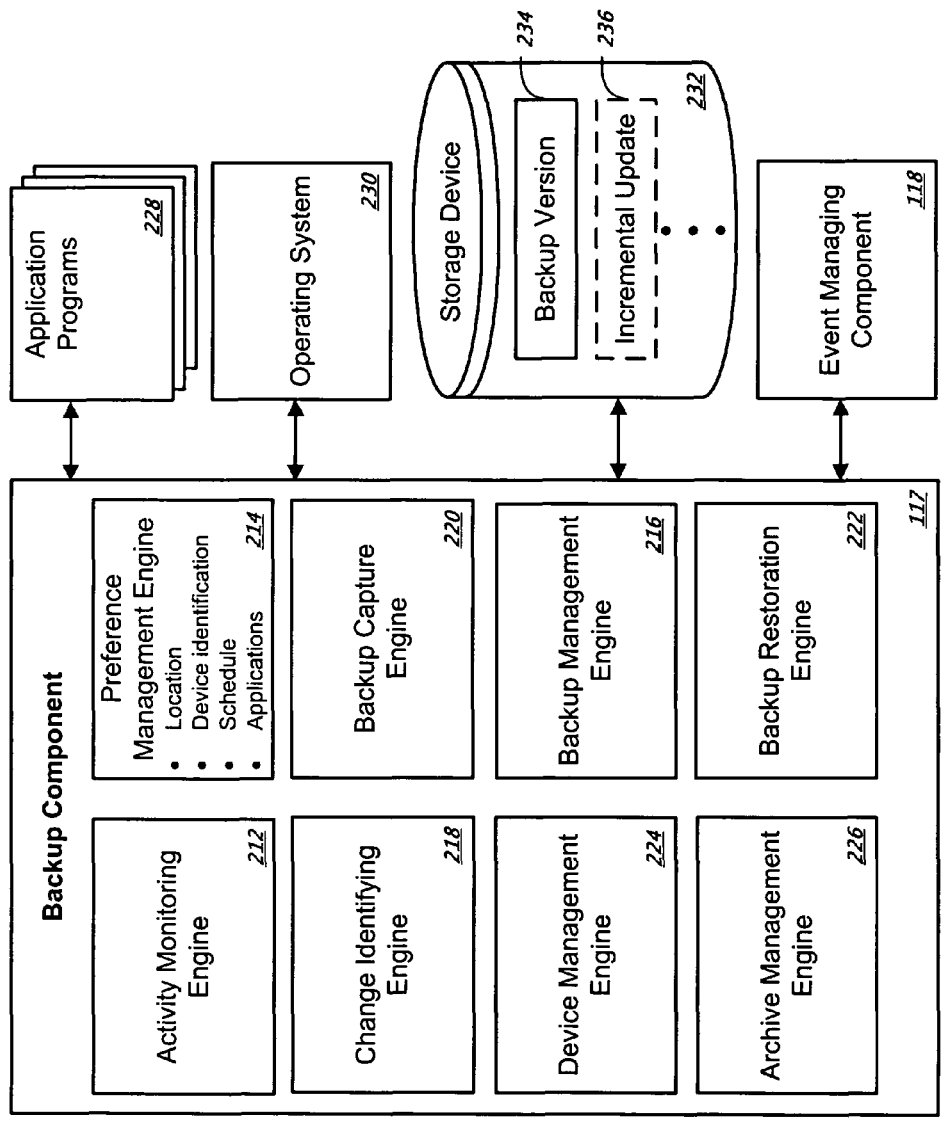
FIG. 5 is a block diagram of an example of an architecture for backing up and restoring application files.

Some operations of the backup component 117 have been described in some of the examples above. There will now be provided an example of features that can be included in the backup component 117. FIG. 5 is a block diagram of an exemplary architecture 201 for enabling the back up and restoration of data (e.g., application files, application data, settings, parameters or the like), such as those associated with a set of application programs 228. Backup component 117 provides back up and restoration capability for the system. Many different items or elements can be the subject of a backup operation in the system. For example, folders, files, items, information portions, directories, images, system or application parameters, playlists, e-mail, inbox, application data, address book, preferences, and the like all can be candidates for archiving. Other types are also possible. In this example, the backup component 117 includes at least one storage device 232. This can be an internal or external resource, or a combination of the two. Any number of local and/or external storage devices can be used by the backup component 117 for storing versions. In this implementation, the backup component 117 views any and all storage device(s) designated for version storage as a single memory bank.

In one implementation, the backup component 117 runs as a background task on an operating system 230, such that the task is not visible to the user. The backup component 117 can be capable of running across multiple user accounts.

The backup component 117 includes an activity monitoring engine 212. In one implementation, the activity monitoring engine 212 monitors for changes within an application view (e.g. files) that are targeted for a backup operation. A change can also include the addition of new files or data or the deletion of the same. In one implementation, the activity monitoring engine 212 is capable of discerning between a substantive change (e.g. the text within a document has been modified) and a non-substantive change (e.g. the play count within an iTunes playlist has been updated, or several changes cancel each other out) through its interaction with the application programs 228. The activity monitoring engine 212 can, for example, create a list of modified elements to be used when a backup event is eventually triggered. In one implementation, the activity monitoring engine 212 can monitor the system for periods of inactivity. The activity monitoring engine 212 can then trigger a backup event during a period of time in which the backup operation will not cause a system slowdown for an active user.

A preference management engine 214 specifies some operating parameters of the backup component 117. In one implementation, preference management engine 214 contains user-specified and/or system default application parameters for the backup component 117. These can include settings for the details of capturing and storing the earlier versions. For example, the preference management engine 214 can determine the frequency of the backup capture, the storage location for the backup versions, the types of files, data, or other items that are eligible for backup capture, and the events which trigger a backup capture (periodic or event-driven, etc.).

In one implementation, the preference management engine 214 can detect that a new storage device is being added to the system and prompt the user whether it should be included as a backup repository. Files and other items can be scheduled for a backup operation due to location (e.g. everything on the C: drive and within D:/photos), a correlation with specific applications (e.g. all pictures, music, e-mail, address book, preferences, and system settings), or a combination of strategies. Different types of items can be scheduled to be stored on different devices or on different segments of a storage device during a backup operation. In one implementation, the backup component 117 stores the versions in a format corresponding to a file system structure.

A backup management engine 216 coordinates the collection, storage, and retrieval of view versions performed by the backup component 117. For example, the backup management engine 216 can trigger the activity monitoring engine 212 to watch for activities that satisfy a requirement specified in the preference management engine 214.

A change identifying engine 218 locates specific views or other items within to determine if they have changed. The change identifying engine 218 can be capable of discerning a substantive change from a non-substantive change, similar to the example described above for the activity monitoring engine 212. In one implementation, the change identifying engine 218 traverses a target set of files, data, or other items, comparing a previous version to the current version to determine whether or not a modification has occurred.

A backup capture engine 220 locates files, data, or other items that are to be backed up. The backup capture engine 220 can invoke the activity monitoring engine 212 and/or the change identifying engine 218, for example, to generate a capture list. The backup capture engine 220 can then store copies of these elements in one or more targeted storage repositories. The backup capture engine 220 can track multiple version copies of each item included in the backup repository.

The backup component 117 includes a backup restoration engine 222 to restore previous views (e.g. versions of files, data, or other items). In one implementation, the backup restoration engine 222 provides a user interface (e.g., a graphical user interface) where a user can select the item(s) to be restored.

A device management engine 224 handles the addition and removal of individual storage devices to be used for archiving views. In one implementation, the preference management engine 214 obtains user settings regarding the identification of individual storage devices for use in archiving. These settings could include, but are not limited to, particular segments of individual devices to use, a threshold capacity which can be filled with archive data, and individual applications to archive to each device. The device management engine 224 records the storage device settings obtained by the preference management engine and uses them to monitor storage device activity. In one implementation, the device management engine 224 can alert the user when a new device has been added to the system. In one implementation, the device management engine 224 can alert the user when an archive-enabled device has been removed from the system. In yet another implementation, the device management engine 224 can alert the user when an archive-enabled device is nearing its threshold storage capacity setting.

An archive management engine 226 tracks where archived views are being stored. In one implementation, the archive management engine 226 obtains user options from the preference management engine. Such settings can include, but are not limited to, methods to be used to remove older or otherwise unnecessary archived views. These settings can establish criteria for archived view deletion, for instance in the event of storage capacity being reached or on a regular basis. In one implementation, the archive management engine 226 alerts the user when archives are missing because a device has gone offline. In another implementation, the archive management engine 226 bars a user from viewing another user's archived data due to system permissions settings.

In this example, the first external storage device 232 is being used by the backup component 117 for archiving. The first device 232 contains an initial backup version 234, which is the first archived view created within this device for a particular item. The first device 232 also contains an incremental update 236. In one implementation, the incremental update 236 contains links back to data stored within initial backup 234, such that only one copy of an unchanged piece of data is retained. In this manner, links can also exist between incremental updates. Each incremental update can then contain a copy of each new or changed data item plus a link back to a previously stored copy of each unchanged data item. Any number of incremental updates can exist. If the user changes the scope of data that is being backed up from one incremental update period to another so that the scope of data now includes new data areas, a portion of an incremental update can be considered similar to an initial backup version. Other archive management techniques could be used.

The backup component 117 can use information stored by the event managing component 118 during incremental backup creation. For example, as described with reference to FIG. 4, events stored by the event managing component 118 can provide the backup component 117 with a list of changed elements since the last incremental backup event. In some implementations, the backup component 117 includes some or all portions of the event managing component 118. In another implementation, the event managing component 118 includes some or all portions of the backup component 117.

Any number of storage devices can be used by the backup component. In one implementation, different storage devices contain the backup version and incremental updates of data belonging to different applications or to different users on the system. As another example, two or more storage devices can be responsible for backing up contents from separate applications in the system.

The archived copies can be compressed and/or encrypted. An example of a compression technique is the ZIP file format for data compression and archiving. An example of an encryption technique is the RSA algorithm for public key encryption. Other compression techniques or encryption techniques could be used.

In one implementation, if multiple users make use of the time machine backup component 117 on a single system, each user can select to keep separate archives. Access to an individual user's archives can be password protected or otherwise held in a secure manner. In one implementation, the archive storage structure mimics a typical file system structure, such that the archived versions can be perused using a standard file system viewing utility.

Figure 6:
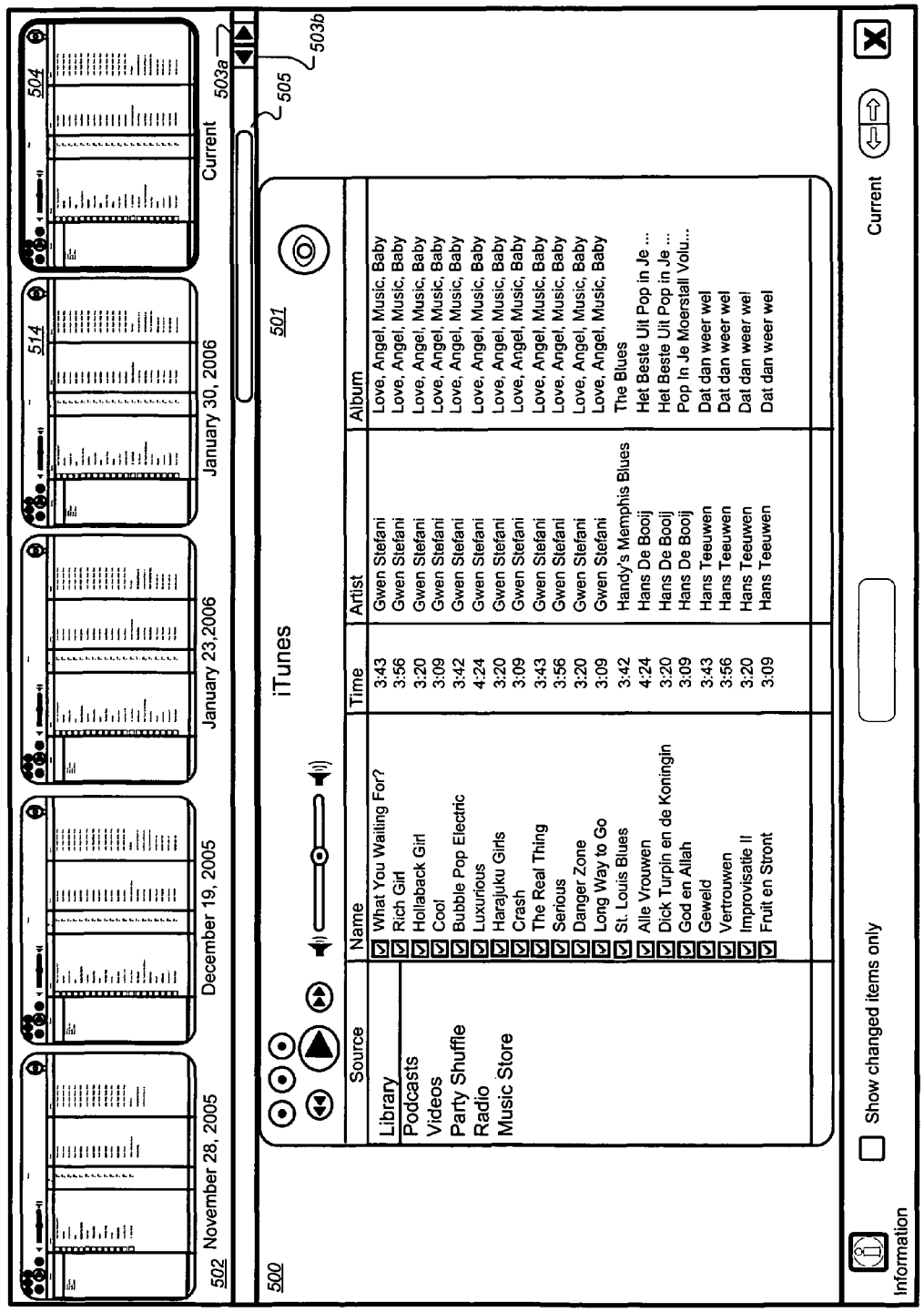
FIG. 6 is a screen shot showing a time machine interface.

It has been mentioned that the backup component 117 can be used for selective restoration of a captured backup version, or a portion thereof. There will now be described with reference to FIG. 6 an example of a user interface that can be generated to facilitate such restoration. The interface is here referred to as a time machine interface 500, and includes a presentation window 501, a timeline 502, and function buttons. The timeline 502 includes a number of snapshots. As used herein, a snapshot refers to a backup element stored in a historical archive that includes a backup of selected items or content as specified by the backup component 117 (FIG. 1). The time machine engine can be activated to backup or restore media content within the iTunes™ application (available from Apple Computer in Cupertino, Calif.) or another application.

The time machine user interface 500 can also include function buttons. For example, the interface 500 can include arrow buttons 503a and 503b, and an associated scroll bar 505 to allow the user to navigate to additional snapshots not shown in the current timeline window. Thus, there can be a large number of snapshots from which to select. As shown, the presentation window 501 is displaying the current state of the iTunes™ application because a "current" snapshot 504 has been selected (highlighted) in the timeline. The current snapshot can be a default selection. The presentation window 501 can show the contents corresponding to the currently selected snapshot, or a portion thereof. Here, the window 501 shows a list of songs that are available in the iTunes™ application, a list sometimes referred to as a playlist.

In this particular example, the timeline contains a date beneath each snapshot indicating when the snapshot was taken. In some implementations, the user can select items or content within the playlist of any of the snapshots. The selection functionality can be used in earlier snapshots, such as snapshot 514, to restore missing data to the state associated with the current snapshot 504.

The timeline 502 can include a number of snapshots representing earlier versions or states of the iTunes™ library that have been backed up. Each snapshot provides a screenshot representation of the earlier version of the iTunes™ library at a particular point in time. In some implementations, the timeline 502 includes a visual representation of backup elements, such as a miniature version of the earlier state. The timeline can appear across the top portion of the time machine interface 502 (as shown). Alternatively, the timeline does not appear in the top portion of the time machine interface 500 until a user moves their cursor to (or otherwise activates) the timeline (e.g., by activating the top portion of the interface).

The snapshots within the timeline 502, in one implementation, were created by the backup component 117 using a list of event notifications generated by the event management component 118 (FIG. 1). In another implementation, changes occurring to the current playlist are captured by the monitoring engine 202 (FIG. 2) of the event management component 118.

In the case where the event notification queue 204 is at or beyond its threshold value, for example, the event notifications generated through the modification of the contents of the iTunes™ application can be combined by the combining engine 206. For example, assume that modifications are made to the songs "Rich Girl" and "Crash", both belonging to the album Love, Angel, Music, Baby and that the event notification queue is currently above its capacity. The notifications relating to these modifications can then be combined to create a single event notification regarding the album Love, Angel, Music, Baby. At a later time, when the combined event notification is to be processed, the album Love, Angel, Music, Baby can be scanned to determine what events were dropped, and the corresponding backups can thereafter be performed. Assume, as another example, that modifications are instead made to "Rich Girl" of the album Love, Angel, Music, Baby and to "St. Louis Blues" of the album The Blues, and that the event notifications corresponding to these changes are subsequently combined. Later, upon event processing, the playlist covering both affected albums (and, in some situations, several other albums) can be scanned to determine what events were dropped, for performing the corresponding backup operations. Thus, the latter example can require more extensive scanning than the former.

In the above description, for purposes of explanation, numerous specific details are set forth in order to provide a thorough understanding. It will be apparent, however, to one skilled in the art that implementations can be practiced without these specific details. In other instances, structures and devices are shown in block diagram form in order to avoid obscuring the disclosure.

In particular, one skilled in the art will recognize that other architectures and graphics environments can be used, and that the examples can be implemented using graphics tools and products other than those described above. In particular, the client/server approach is merely one example of an architecture for providing the functionality described herein; one skilled in the art will recognize that other, non-client/server approaches can also be used. Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An apparatus for performing the operations herein can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it could prove convenient to construct more specialized apparatuses to perform the method steps. The required structure for a variety of these systems will appear from the description. In addition, the present examples are not described with reference to any particular programming language. It will be appreciated that a variety of programming languages can be used to implement the teachings as described herein. Furthermore, as will be apparent to one of ordinary skill in the relevant art, the modules, features, attributes, methodologies, and other aspects can be implemented as software, hardware, firmware or any combination of the three. Of course, wherever a component is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present description is in no way limited to implementation in any specific operating system or environment.

The subject matter described in this specification can be implemented as one or more computer program products, i.e., one or more modules of computer program instructions encoded on a computer readable medium for execution by, or to control the operation of, data processing apparatus. The instructions can be organized into modules (or engines) in different numbers and combinations from the exemplary modules described. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method comprising:
   determining that a threshold associated with a number of pending event notifications in a queue has been exceeded by an incoming event notification, where each event notification identifies a change to one or more data element entries within a computer system and where each event notification is associated with one or more parent levels of a hierarchical file system;
   identifying, using one or more processors, a plurality of pending event notifications that can be combined including determining that two or more event notifications have a common parent level; and
   combining two or more event notifications such that the number of pending event notifications, including the combined two or more event notifications, in the queue no longer exceeds the threshold number of event notifications, including replacing two or more event notifications with a single event notification identifying a change to the common parent level.

2. The method of claim 1, further comprising:
   scanning the common parent level to identify the combined event notifications; and
   performing a backup operation including backup data associated with the combined event notifications.

3. The method of claim 2, where scanning the common parent level includes comparing the parent data with data from a previous backup to identify changed data.

4. The method of claim 1, where receiving an incoming event notification includes receiving an event notification identifying a change to a file system at an event notification queue.

5. The method of claim 1, further comprising:
   identifying one or more event notifications as protected, where protected event notifications cannot be combined.

6. The method of claim 1, further comprising:
   determining a number of event notifications to combine according to one or more criteria.

7. The method of claim 6, where the criteria include minimizing a number of combined event notifications.

8. The method of claim 7, where minimizing the number of combined event notifications includes combining a minimum number of event notifications such that the incoming event notification does not exceed the threshold.

9. A computer program product encoded on a computer-readable storage medium, operable to cause data processing apparatus to perform operations comprising:
   receiving an incoming event notification, where the event notification corresponds to file system activity related to one or more data elements within a computer system;
   determining that a threshold associated with pending event notifications in a queue has been exceeded by the incoming event notification, where each event notification identifies a change to one or more data element entries within a computer system and where each event notification is associated with one or more parent levels of a hierarchical file system;
   identifying a plurality of pending event notifications that can be combined including determining that two or more event notifications have a common parent level; and
   combining two or more event notifications such that the number of pending event notifications, including the combined two or more event notifications, in the queue no longer exceeds the threshold number of event notifications, including replacing two or more event notifications with a single event notification identifying a change to the common parent level.

10. The computer program product of claim 9, further operable to cause data processing apparatus to perform operations comprising:
    scanning the common parent level to identify the combined event notifications; and
    performing a backup operation including backup data associated with the combined event notifications.

11. The computer program product of claim 10, where scanning the common parent level includes comparing the parent data with data from a previous backup to identify changed data.

12. The computer program product of claim 9, where receiving an incoming event notification includes receiving an event notification identifying a change to a file system at an event notification queue.

13. The computer program product of claim 9, further operable to cause data processing apparatus to perform operations comprising:
    identifying one or more event notifications as protected, where protected event notifications cannot be combined.

14. The computer program product of claim 9, further operable to cause data processing apparatus to perform operations comprising:
    determining a number of event notifications to combine according to one or more criteria.

15. The computer program product of claim 14, where the criteria include minimizing a number of combined event notifications.

16. The computer program product of claim 15, where minimizing the number of combined event notifications includes combining a minimum number of event notifications such that the incoming event notification does not exceed the threshold.

17. A system comprising:
one or more processors configured to perform operations including:
receiving an incoming event notification, where the event notification identifies particular file system activity; and
determining that a threshold associated with pending event notifications in a queue has been exceeded by the incoming event notification, where each event notification identifies a change to one or more data element entries within a computer system and where each event notification is associated with one or more parent levels of a hierarchical file system;
means for identifying a plurality of pending event notifications that can be combined including determining that two or more event notifications have a common parent level; and
means for combining two or more event notifications such that the number of pending event notifications, including the combined two or more event notifications, in the queue no longer exceeds the threshold number of event notifications, including replacing two or more event notifications with a single event notification identifying a change to the common parent level.

* * * * *

UNITED STATES PATENT AND TRADEMARK OFFICE
CERTIFICATE OF CORRECTION

| | | |
|---|---|---|
| PATENT NO. | : 8,370,853 B2 | Page 1 of 1 |
| APPLICATION NO. | : 11/499866 | |
| DATED | : February 5, 2013 | |
| INVENTOR(S) | : Giampaolo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this
Thirtieth Day of September, 2014

Michelle K. Lee
*Deputy Director of the United States Patent and Trademark Office*